United States Patent
Brendel

[15] 3,674,846
[45] *July 4, 1972

[54] SYNTHESIS OF SUBSTITUTED 7-OCTEN-1-OLS

[72] Inventor: Gottfried J. Brendel, Baton Rouge, La.
[73] Assignee: Ethyl Corporation, New York, N.Y.
[ * ] Notice: The portion of the term of this patent subsequent to Feb. 3, 1987, has been disclaimed.
[22] Filed: Nov. 10, 1969
[21] Appl. No.: 875,554

[52] U.S. Cl. .........................260/632 R, 252/89, 252/522, 252/DIG. 5, 252/DIG. 13, 252/DIG. 16, 260/448 R, 260/618 R, 260/633, 260/966, 260/967
[51] Int. Cl. .........................C07c 33/02, C11d 3/50
[58] Field of Search .....................260/632 R, 631 R, 618 R

[56] References Cited

UNITED STATES PATENTS

| | | | |
|---|---|---|---|
| 3,493,623 | 2/1970 | Brendel | 260/632 R |
| 3,217,041 | 11/1965 | Houlihan | 260/631.5 |
| 3,244,752 | 4/1966 | Eschinasi | 260/638 P |
| 3,227,640 | 1/1966 | Foreman et al. | 260/638 B |

OTHER PUBLICATIONS

Merck Indep, 6th ed., (1952), p. 253.
Buendia, " Chem Abstr.," Vol. 66, (1967), p. 2714, item 28610 k.

*Primary Examiner*—Leon Zitver
*Assistant Examiner*—Joseph E. Evans
*Attorney*—Donald L. Johnson

[57] ABSTRACT

Novel compounds, 7-octen-1-ols having one or two methyl groups in the 6 position are prepared by hydrolyzing an intermediate formed by reaction among aluminum, tetrahydropyran or an alkyl substituted tetrahydropyran, a hydrocarbyl aluminum hydride and butadiene or butadiene substituted on either or both of the internal carbon atoms. During at least a portion of the reaction period the reaction temperature must be in the range of from about 185° to about 210°C. so that there is formed an intermediate condensation product via cleavage of the ring of the tetrahydropyran reactant. The 7-octen-1-ols are useful as perfumes, monomers, chemical intermediates and surface active agents.

16 Claims, No Drawings

3,674,846

SYNTHESIS OF SUBSTITUTED 7-OCTEN-1-OLS

This invention relates to and has as its principal object the provision of 7-octen-1-ols having one or two methyl groups in the 6 position and a method for their synthesis.

The foregoing octenols make up a hitherto unknown class of compounds. As near as can be determined a method for their synthesis has not been available heretofore.

In accordance with this invention 7-octen-1ols having one or two methyl groups in the 6 position are prepared by a two-step process. In the first step, reaction is effected among aluminum, tetrahydropyran or an alkyl substituted tetrahydropyran, a hydrocarbyl aluminum hydride, and butadiene or butadiene substituted on either or both of its internal carbon atoms by a hydrocarbyl group. For at least a portion of the reaction period the reaction mixture must be maintained at a temperature from about 185° to about 210° C. In this way the tetrahydropyran or alkyl substituted tetrahydropyran present in the reaction mixture is cleaved such that an aluminum-containing condensation product is produced.

In the second step of this process the foregoing intermediate condensation product is subjected to hydrolysis. This hydrolysis reaction is readily effected by exposing the intermediate to the action of water and more preferably to aqueous mineral acids or bases such as hydrochloric acid, sulfuric acid, aqueous sodium hydroxide solution, or the like. The hydrolysis results in the liberation of the 7-octen-1-ols having one or two methyl groups in the 6 position.

The optimum reaction conditions will of course vary to some extent depending upon the characteristics of the particular reactants being utilized. As noted above, the reaction mixture will be heated for at least a part of the reaction period to a temperature in the range from about 185° to about 210° C. sufficient to form an intermediate condensation reaction product through cleavage of the ring of the tetrahydropyran or alkyl substituted tetrahydropyran employed. In most cases it will be found desirable to heat the reactants for an initial period of time at a temperature in the range of from about 120° to about 175° C. Thereafter the temperature is increased to between about 185° and about 210° C. and held there for an additional period of time sufficient to result in the formation of the desired aluminum-containing condensation product via cleavage of the six-membered ring of the tetrahydropyran reactant. The preferred cleavage temperatures for use with tetrahydropyran and most lower alkyl substituted tetrahydropyrans fall within the range of from about 190° to about 205° C. At these temperatures the cleavage reaction proceeds at a satisfactory rate and undesired side reactions are kept to a minimum.

The pressure within the reaction zone may be varied to suit the needs of the occasion. Ordinarily it will be found desirable to conduct the reaction at a superatmospheric pressure, for example, by conducting the reaction in a closed reactor under essentially autogenous pressure. In general, pressures ranging up to about 500 psig will be found suitable and convenient. Reaction times are likewise susceptible to variation and ordinarily will range from a matter of a few minutes up to about 8 hours or more. Generally speaking, the higher the reaction temperature the shorter the reaction time.

The aluminum used in the process of this invention may be in the form of chips, turnings, powder, or other similar particulated states. It is definitely preferably to employ activated aluminum. Methods for producing activated aluminum are standard and well known in the art. For further details, reference may be had, for example, to U.S. Pat. Nos. 2,885,314; 2,892,738; 2,921,876; 3,100,786; and 3,104,252.

Cycloparaffinic monoethers used in the process of this invention are those which contain one ether oxygen in a six-member ring, the oxygen atom being the only hetero atom present. In other words, in this process use is made of tetrahydropyran and alkyl substituted tetrahydropyrans, such as 2-methyltetra-hydropyran; 2,2-dimethyl tetrahydropyran; 2,2,6-trimethyl tetrahydropyran; 2,2,6,6-tetramethyl tetrahydropyran; 2-pentyl tetrahydropyran; 2,6-dimethyl tetrahydropyran; 2-propyl tetra hydropyran; 2,2,6-trimethyl-6-ethyl tetrahydropyran; 2-tridecyl tetrahydropyran; and the like. On the basis of reactivity, availability, cost and usefulness of end product, tetrahydropyran is the preferred monoether reactant.

The hydrocarbon aluminum hydride reactant used in the process may be a dihydrocarbyl aluminum hydride ($R_2AlH$) in which the R groups are hydrocarbyl groups (alkyl, aryl, cycloalkyl, alkenyl, aralkyl, alkaryl, etc.).

Thus use may be made of such compounds as dimethylaluminum hydride, diethylaluminum hydride, dipropylaluminum hydride, dibutylaluminum hydride, diisobutylaluminum hydride, dioctylaluminum hydride hydrode, dioctadecylaluminum hydride, dicyclohexylaluminum hydride, dimethylcyclohexyl aluminum hydride, diallylaluminum hydride, dibenzylaluminum hydride, diphenethylaluminum hydride and the like. It is generally preferable to utilize a dialkylaluminum hydride, especially those having alkyl groups containing up to about 18 carbon atoms. The most preferred compounds are the dialkylaluminum hydrides in which each alkyl group is a lower alkyl group and thus contains up to about six carbon atoms. If desired, the hydrocarbon aluminum hydride may be generated in situ by initially reacting aluminum with trihydrocarbyl aluminum (e.g., triethylaluminum) under a hydrogen atmosphere according to known technology.

The diene reactant is a conjugated diene hydrocarbon e.g., butadiene or butadiene substituted on either or both of the internal carbon atoms. This reactant will contain from four to about 18 carbon atoms in the molecule. Exemplary of such compounds are butadiene, isoprene, 2,3-dimethyl butadiene, 2-ethyl butadiene, myrcene, 2-phenyl butadiene, and the like.

If desired, the foregoing reaction may be conducted in an ancillary reaction diluent or solvent which is inert under the reaction conditions being utilized. For example, use may be made of high boiling paraffinic or cycloparaffinic hydrocarbons which remain in the liquid state of aggregation under the temperatures and pressures of the cleavage reaction. Ordinarily, however, the reaction will be carried out in the absence of an ancillary solvent or diluent.

The relative proportions of the reactants do not appear to be critical as long as there is present a sufficient amount of each reactant to participate in the reaction. It will of course be understood that the reaction mixture of the first step of the process should be kept essentially anhydrous and that excessive exposure of the system to air should be avoided.

In the second step of the process of this invention the aluminum-containing intermediate reaction product is subjected to hydrolysis whereby the desired 6-methylated-7-octen-1ol is liberated. Isolation and purification of the alkenol is achieved by conventional means, e.g., distillation at reduced pressure, etc. The hydrolysis step itself is normally performed at or below room temperature although temperatures within the range of about −10° to about 50° C. are usually satisfactory.

This invention and the various embodiments thereof may be further understood by reference to the following illustrative examples.

EXAMPLE I

A mixture composed of 500 mmoles of isoprene, 15 grams of activated aluminum powder, 1.03 moles of tetrahydropyran and 85 of diisobutylaluminum hydride was heated in a closed reaction vessel for 1 hour at 150° C. and then for 2 hours at 185° C. After cooling to room temperature, a portion of the reaction product was hydrolyzed at 0–5° C. using dilute hydrochloric acid. This resulted in the liberation of 6,7-dimethyl-7-octen-1-ol along with a lesser quantity of 6,6-dimethyl-7-octen-1-ol. These alkenols possess very desirable fragrance characteristics.

EXAMPLE II

Repetition of the procedure of Example I using a reaction temperature of 200° C. for 1.5 hours followed by hydrolysis results in a higher yield of the same alkenols.

EXAMPLE III

On heating 500 mmoles of butadiene, 15 grams of activated aluminum, one mole of tetrahydropyran, and 85 mmoles of diisobutylaluminum hydride in a sealed autoclave for 3 hours at 200° C. and then hydrolyzing the reaction mixture with water, 6-methyl-7-octen-1-ol is produced.

EXAMPLE IV

By substituting 2,3-dimethyl butadiene-1,3 for the butadiene of Example III, the hydrolysis reaction results in the formation of 6,6,7-trimethyl-7-octen-1-ol.

EXAMPLE V

Example I is repeated using 2-ethyl butadiene in place of isoprene. Upon hydrolysis, a mixture of 6-methyl-7-ethyl-7-octen-1-ol and 6-methyl-6-ethyl-7-octen-1-ol is formed.

EXAMPLE VI

A system composed of 500 mmoles of 2,3-dimethyl butadiene, 15 grams of activated aluminum powder, one mole of 2-methyl tetra hydropyran and 85 mmoles of diisobutylaluminum hydride is sealed in an autoclave and heated for 1 hour at 150° C. and for 3 hours at 195° C. Room temperature hydrolysis of the resultant reaction product results in the formation of 1,6,6,7-tetramenthl-7-octen-1-ol.

Because of their fragrance characteristics many of the 6-methyl-7-octen-1-ols formed via the hydrolysis reaction are of utility as perfumes, especially in connection with household detergents, shampoos, toilet bars and the like. Other utilities for these alkenols include their use as monomers, intermediates for the synthesis of polyfunctional molecules (branched chain glycols, etc.) and as surface active agents.

The 6-methylated-7-octen-1-ols may be halogenated or hydrohalogenated and then used as, or converted into, plasticizers, flameproofing agents, pesticides, extreme pressure additives, and the like. For example, addition of bromine to the alkenols results in the formation of the corresponding 6-methylated-7,8-dibromooctan-1-ols. These in turn may be reacted with $PCl_3$, $POCl_3$, or $PSX1_3$ to produce dibromoalkyl phosphites, phosphates and thiophosphates.

I claim:

1. A compound selected from the group consisting of
6-methyl-7-octen-1-ol,
6,7-dimethyl-7-octen-1-ol,
6,6-dimethyl-7-octen-1-ol,
6,6,7-trimethyl-7-octen-1-ol,
6-methyl-7-ethyl-7-octen-1-ol and
6-methyl-6-ethyl-7-octen-1-ol.

2. A compound according to claim 1, viz., 6-methyl-7-octen-1-ol.

3. A compound according to claim 1, viz., 6,7-dimethyl-7-octen-1-ol.

4. A compound according to claim 1, viz., 6,6-dimethyl-7-octen-1-ol.

5. A compound according to claim 1, viz., 6,6,7-trimethyl-7-octen-1-ol.

6. A compound according to claim 1, viz., 6-methyl-7-ethyl-7-octen-1-ol.

7. A compound according to claim 1, viz., 6-methyl-6-ethyl-7-octen-1-ol.

8. A process of preparing a 7-octen-1-ol having one or two methyl groups in the 6 position which comprises (a) reacting aluminum, a cycloparaffinic monoether selected from the group consisting of tetrahydropyran and alkyl substituted tetrahydropyrans, a hydrocarbyl aluminum hydride, and a conjugated diene hydrocarbon selected from the group consisting of butadiene and butadiene substituted on either or both of the internal carbon atoms and having up to 18 carbon atoms, at an elevated temperature in the range of from about 185° to about 210° C. sufficient to form an intermediate condensation reaction product through cleavage of the ring of said monoether, and (b) hydrolyzing the reaction product.

9. The process of claim 8 wherein the reaction of (a) is effected in a closed reactor and under essentially autogenous pressure.

10. The process of claim 8 wherein the aluminum is activated aluminum.

11. The process of claim 8 wherein the conjugated diene is butadiene, isoprene, 2,3-dimethyl butadiene-1,3, 2-ethyl butadiene or myrcene.

12. The process of claim 8 wherein said monoether is tetrahydropyran.

13. The process of claim 8 wherein the hydrocarbyl aluminum hydride is a dialkylaluminum hydride.

14. The process of claim 8 wherein the hydrocarbyl aluminum hydride is diisobutylaluminum hydride.

15. The process of claim 8 wherein the aluminum is particulate, activated aluminum; said monoether is tetrahydropyran; the hydrocarbyl aluminum hydride is a dialkylaluminum hydride; and the conjugated diene is butadiene, isoprene, 2,3-dimethyl butadiene-1,3, 2-ethyl butadiene or myrcene.

16. The process of claim 8 wherein the aluminum is particulate, activated aluminum; said monoether is tetrahydropyran; the hydrocarbyl aluminum hydride is a dialkylaluminum hydride; the conjugated diene is butadiene, isoprene, 2,3-dimethyl butadiene-1,3, 2-ethyl butadiene, or myrcene; and the reaction of (a) is effected in a closed reactor at a temperature in the range of from about 190° to about 205° C. under essentially autogenous pressure.

* * * * *